Jan. 8, 1963   K. O. KOPARE   3,071,987
FILING DEVICE FOR SHARPENING AND FIXING THE
TOOTH CHAIN OF THE MOTOR SAW
Filed Nov. 7, 1960   2 Sheets-Sheet 1
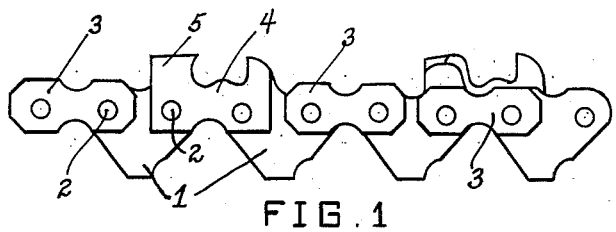
FIG. 1
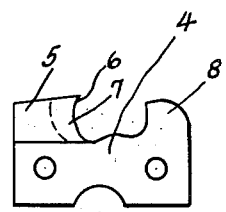
FIG. 3
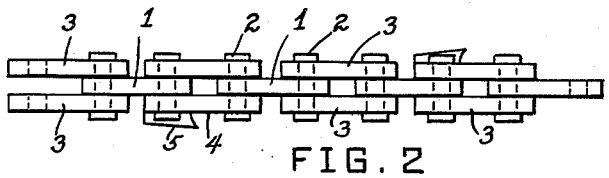
FIG. 2
FIG. 5
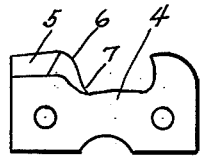
FIG. 4
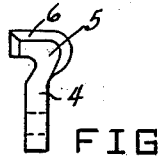
FIG. 6
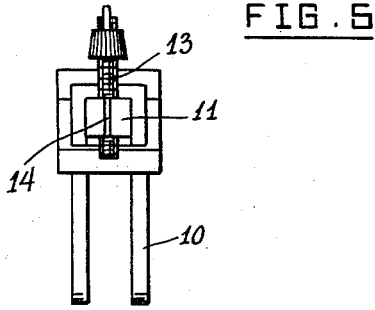
FIG. 8
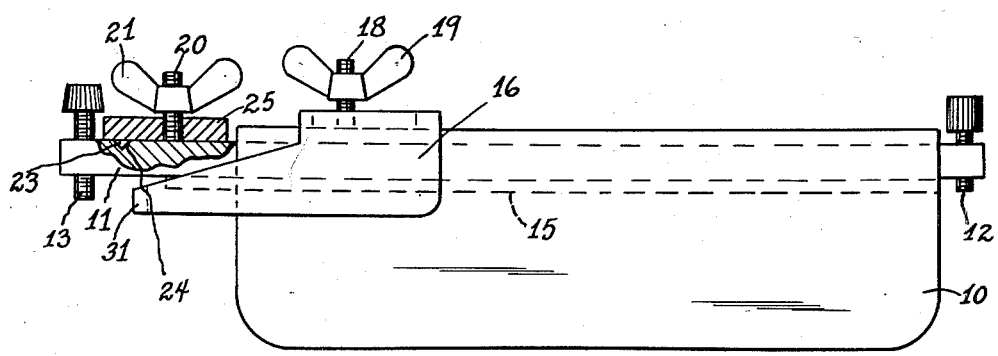
FIG. 7
INVENTOR.
KAUKO OSKARI KOPARE
BY Herman L Gordon
ATTORNEY

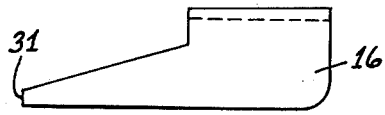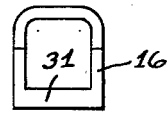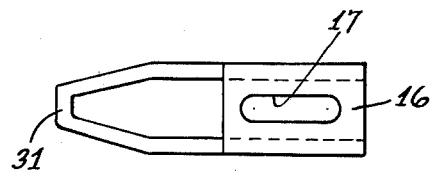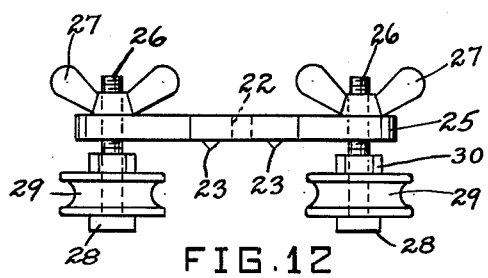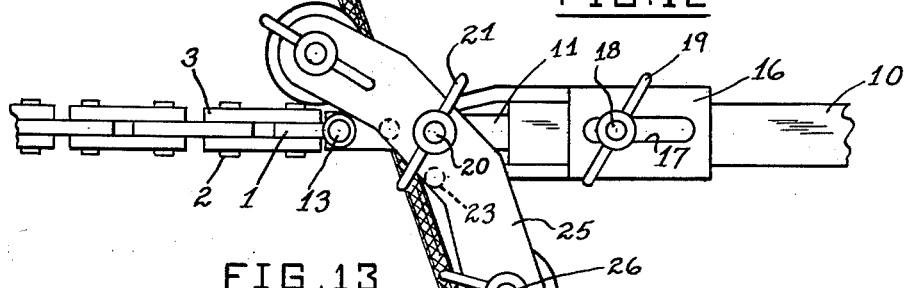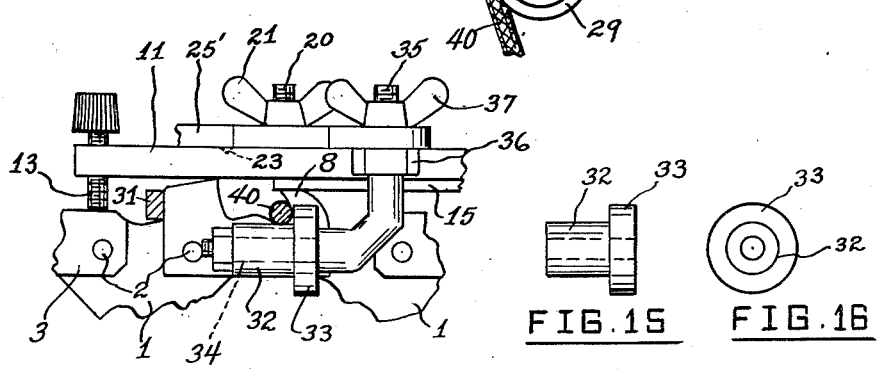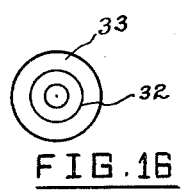

United States Patent Office 3,071,987
Patented Jan. 8, 1963

3,071,987
FILING DEVICE FOR SHARPENING AND FIXING THE TOOTH CHAIN OF THE MOTOR SAW
Kauko Oskari Kopare, Helsinki, Finland
(Vilppula, Maakanen, Finland)
Filed Nov. 7, 1960, Ser. No. 67,801
3 Claims. (Cl. 76—36)

This invention concerns a filing device for sharpening and fixing the tooth chain of a motor saw by filing.

The invention is characterized in that the filing device is provided with rollers, or the like, upon which the file can be moved while the rollers, or corresponding devices, due to the motion of the file, are able to rotate or glide in such a manner that they do not wear on filing to any noteworthy extent, and which rollers, or corresponding members, guide the reciprocating motion of the file, so that the file is at the correct angle, e.g., 35°, longitudinally of the chain, and that on filing, the rollers, or corresponding devices, at the same time guide the file in such a way, that it cannot penetrate too deeply in the direction lengthwise or crosswise of the chain.

The invention is illustrated in the enclosed drawings, in which—

FIG. 1 presents a portion of a tooth chain of a motor saw from the side,

FIG. 2, the same as above seen from below,

FIG. 3, an individual right-hand grooved-edge tooth from the side, and

FIG. 4, a left-hand grooved-edge tooth from the side,

FIG. 5, a right-hand grooved-edge tooth seen from above, and FIG. 6, the same as above seen from behind, FIG. 7, the filing device, partly in cross-section, seen from the side, and FIG. 8, from one end with the roller attachment omitted, FIG. 9, an individual part of the device from the side, FIG. 10, the same from the front, and FIG. 11, the same from above, FIG. 12, a part for attachment to the device from the side, and FIG. 13, the same from above, shown attached to the device of FIGURE 7 and in operating position, FIG. 14, a variation of a part of the device from the side, shown attached to its supporting plate and in operating position, and FIG. 15, a roller for the above part seen from the same direction as in FIG. 14, and FIG. 16, the same roller seen from the direction perpendicular to said direction.

As it is known, the tooth chain of a motor saw is an endless chain made to rotate by the motor while the motion of the grooved-edge teeth of the chain cuts or saws the wood. A part of such a chain is seen in FIG. 1. The cogs of the pulling gear of the motor contact pulling members 1 of the chain forcing the chain forwards. Pulling members 1 are moving within a groove directing the motion of the chain, which is able to bend around bolts 2, while moving as an endless chain. Pulling members 1 are connected with each other at every other interspace 2 by connecting members 3, which are attached on both sides of the pulling members by means of bolts. Again, every other interspace between the pulling members is connected, so that the pulling members on one side are joined by connecting member 3, and on the other side either by a right-hand or a left-hand grooved-tooth member 4. The grooved-tooth member 4 either has a left-hand or a right-hand groove, i.e. there is a grooved part 5 either at the right or the left side. Upper edge 6 and front edge 7 are ground sharp and cut the wood by carving while the chain is moving. In order to enable upper edge 6 and front edge 7 of the chain to cut wood properly, the groove tapers off backwards relative to the direction of its motion, at the same time as it slopes laterally, as indicated particularly in FIGS. 3-6.

The grooved-tooth member has also a so-called depth-regulation tooth 8, which is slightly lower than the front edge of the cutting grooved-edge tooth, the object of the depth-regulation tooth being to regulate the cutting depth of the grooved-edge tooth into the wood. The object of the depth-regulation tooth is also to clear off sawdust from the kerf formed.

The cutting tooth, however, gets dull with time during usage. Dullness is indicated for example by the cutting front edge of the grooved-edge tooth becoming shiny. Naturally, wood cutting by the motor saw is then not equally perfect, because the front edge of the cutting grooved-edge tooth and the upper edge have to be sharpened. The cutting grooved-edge teeth have to be as similar as possible with respect to each other. It is also important that the cutting front edges 7 of the grooved-edge teeth are approximately perpendicular to the longitudinal direction of the chain and that the cutting upper edges 6 of the cutting grooved-edge teeth are at an angle of 35° obliquely with respect to the longitudinal direction of the chain. This 35° angle is indicated by a line of dots and dashes 9 in FIG. 5. If the grooved-edge teeth of the chain differ from each other in shape, shaking and uneven operation in sawing will occur. For instance, if front edge 7 differs considerably from its vertical position with respect to the longitudinal direction of the chain, the corresponding grooved-tooth member correspondingly seeks to turn the other way from its correct vertical position, which wears more on the respective part of the chain than on other parts. It is also important that the depth-regulation tooth is made correspondingly lower as the cutting front- and upper edge of the cutting groove are moved backwards with respect to the direction of pull during sharpening, at which the grooved-edge tooth correspondingly is reduced in height. By making the depth-regulation teeth 8 lower in the way desired at each instant, the cutting depth of the grooved-edge teeth can be suitably adjusted either for winter or summer operation, or for motors of varying power. However, the different depth-regulating teeth may always be of equal height.

As the preceding indicates, it is quite important, besides the depth-regulation teeth being of equal height, that all the grooved-edge teeth of the motor saw obtain a completely uniform shape on sharpening, and that their correct shape is maintained, at which the cutting front edges 7 are perpendicular to the direction of pull, and the cutting upper edges are at a 35° angle with the direction of the pull. Today, the grooved teeth of the chain often are sharpened with the chain mounted on the motor saw. However, with the chain attached to the motor saw, no part is straight as shown in FIGS. 1 and 2, whereas all parts of the entire chain are more or less bent. Therefore, sharpening by filing, with the chain positioned on the motor saw is also difficult and inaccurate.

According to this invention, sharpening of the chain teeth is carried out by filing, employing a filing device composed of a U-shaped plate-like body 10, which when seen from its ends is turned downwards as shown in FIGS. 7 and 8, and which has attached on the inside a bar-shaped part 11 of square cross-section, the ends of which are provided with threaded holes and regulation screws 12 and 13. For the adjustment of the tightness of the regulation screws, both ends of bar 11 are furnished with a slit 14 reaching through from the end to the hole of the regulation screw. A plate-like part 15 is fixed to the bottom side of bar 11 inside of U-shaped body 10.

On top of U-shaped body 10, and partly surrounding it, piece 16 is placed, which taken apart from the rest of the device is presented in FIGS. 9–11. Seen from above, there is opening 17, through which screw 18 extends upwards from U-shaped body 10 and is provided with threaded wing nut 19. Piece 16 can be moved in relation to body 10 the same distance as the length of opening 17, and it is locked in a suitable position by tightening wing nut 19.

Bar 11 also is provided with screw 20 and threaded wing nut 21. Device 25, as shown in FIGURES 12 and 13, can be attached to bar 11 by screw 20 going through hole 22, and either one of conical projections 23 going into recess 24, and it is locked in this position by means of wing nut 21. Plate-like member 25, in FIGURES 12 and 13, is provided on both ends with threaded holes and screws 26, which can be locked in position by means of wing nuts 27. Screws 26 are provided at their bottom ends with flanges 28, and rollers 29 can rotate on the smooth lower part of screws 26, between flanges 28 and nuts 30. Nuts 30 on screws 26 prevent rollers 29 from raising upwards during rotation. Rollers 29 can be suitably made of plastics, their outer surface being shaped as a groove, against the surface of which a file with a round cross-section may engage.

For filing with the filing device, U-shaped plate 10 is placed on top of the tooth chain and around the same, with the teeth against or toward plate 15. The position of the filing device relative to the tooth chain is adjusted by means of regulation screws 12 and 13 with their lower ends contacting the tooth chain. When the device shown in FIGS. 12 and 13 is attached to the rest of the filing device by means of screw 20 and wing nut 21, in the manner illustrated in FIG. 13, the longitudinal axis of the file makes a 35° angle with the lengthwise direction of the tooth chain, suitably in such a way that the position of the file can be used for sharpening either the left-hand or the right-hand grooved-edge tooth, depending upon which one of the projections 23 is fitted into indentation 24.

Device 16, by attaching it to a suitable place on device 10 by means of screws 18 and wing nut 19, can now be suitably used for adjusting the position of the entire filing device relative to the direction of the length of the chain. Therefore, the loop-shaped front edge 31 of device 16 is forced to contact the back edge of the grooved tooth by pressing it by the hand, while edges 6 and 7 (FIGS. 3–6) of the grooved tooth are sharpened with the file pressing against the groove of rollers 29 as far as it can go with the file moving on top of rollers 29 and against same. Thus, the file, shown at 40 in FIG. 13, makes rollers 29 rotate along with it. Rollers made of nylon plastics cause no substantial wear on the file and rotate along with the file, thus preventing the file from penetrating into edges 6 and 7 beyond a given depth and distance, which depth and distance is adjusted with device 16 in the manner described above, as well as with regulation screws 12 and 13.

The filing device can also be used for filing the so-called depth-regulation tooth 8 (FIG. 3) for correct height. In order to do this, device 25, in FIGURES 12 and 13, is detached from the depth-regulation device 25, and replaced by a device, which is quite similar, except for being provided with only one projection instead of the two projections 23, and thus causing the file to move perpendicularly to the longitudinal direction of the chain, when put into hole 24 and the device being fixed in place by means of screw wing nut 21. Rollers 29 may also be replaced by rollers 32 shown in FIGS. 15 and 16, provided with a flange 33, which rollers 32 are able to rotate around shaft 34, end 35 of which is bent upwards, so that it can be attached to the plate-like member 25' by means of nut 36 and wing nut 37, in the same manner as screws 26, seen in FIGS. 12 and 13. Thus rollers 32 including flanges 33 rotate around their horizontal shafts. In this position rollers 32 support the file placed over them, thus preventing it from penetrating too deeply on filing the depth-regulation teeth from above. In this way the height of the depth-regulation teeth 8 seen in FIG. 3 can be adjusted, for instance, by turning regulation screws 12 and 13. Flange 33 guides the file moving on top of the cylindrical part 32 of the roller and prevents the file from pushing backwards against edge 7 (FIG. 3), when the file is contacting flange 33.

The tooth chain seen in FIGS. 1 and 2 can be placed on a suitable support for filing, not described further in this connection. This filing support may suitably be of such a width that this along with the tooth chain fits well in between the two branches of U-shaped body 10, withoutout taking up the entire space, however. Because the tooth chain at tooth plates 4 and intermediate plates 3 is wider than at the pulling plate, U-shaped body 10 may be inclined somewhat with reference to the tooth chain and the filing support, so that either one of the branches of the U-shaped body contacts the tooth chain and the filing support. Which one of the branches should be in contact as mentioned, depends on which tooth groove is to be filed, the right-hand or the left-hand groove. In this manner a deviation of the direction of the cutting edge of the groove from the vertical plane along the longitudinal axis of the tooth chain is suitably obtained. On filing the depth-regulation tooth 8 however, the filing device is mounted on the tooth chain in such a manner, that both branches of body 10 are about equally spaced apart from the lower part of the tooth chain and the filing support, while the filing surface of the depth-regulation tooth will be approximately perpendicular to the sides of the depth-regulation tooth.

The invention is not restricted only to the mode of performance described above and illustrated in the drawings, but it may be varied in several ways within the scope of the patent claims.

I claim:

1. A file supporting and guiding device for use in sharpening the articulated teeth of a chain saw comprising a main support of inverted U-shape adapted to be engaged over a chain saw, a retaining loop element on one end portion of said support engageable around a tooth of the chain saw to retain the support against longitudinal movement relative to the chain saw, a plate-like member on said end portion extending laterally therefrom, a shaft element on said plate-like member, and a guide roller journalled on said shaft element and being provided with means to supportingly engage a portion of a file engaged with the tooth, whereby to constrain the file to be directed at a predetermined fixed angle with respect to the tooth.

2. A file supporting and guiding device for use in sharpening the articulated teeth of a chain saw comprising a main support of inverted U-shape adapted to be engaged over a chain saw, a retaining loop element, means adjustably securing said loop element on one end portion of said support in a position such that the loop element is engageable around a tooth of the chain saw to retain the support against longitudinal movement relative to the chain saw, a plate-like member on said end portion extending laterally therefrom, a shaft element on said plate-like member, and a guide roller journalled on said shaft element and being provided with means to supportingly engage a portion of a file engaged with the tooth, whereby to constrain the file to be directed at a predetermined fixed angle with respect to the tooth.

3. A file supporting and guiding device for use in sharpening the articualted teeth of a chain saw comprising a main support of inverted U-shape adapted to be engaged over a chain saw, a retaining loop element, means adjustably securing said loop element on one end portion of said support in a position such that the loop element is engageable around a tooth of the chain saw to retain the support against longitudinal movement relative to the chain saw, a plate-like member on said end portion extending laterally therefrom, a shaft element on said plate-like member extending substantially perpendicular thereto, and a peripherally grooved guide roller journalled on said shaft element and being provided with means to supportingly engage a portion of a file engaged with the tooth, whereby to constrain the file to be directed at a predetermined fixed angle with respect to the tooth.

References Cited in the file of this patent

UNITED STATES PATENTS

| | | |
|---|---|---|
| 6,858 | Woodruff | Nov. 6, 1849 |
| 98,447 | Tyson | Dec. 28, 1869 |
| 2,038,628 | Barr | Apr. 28, 1936 |